United States Patent [19]

Naumann

[11] Patent Number: 5,442,859
[45] Date of Patent: Aug. 22, 1995

[54] DEVICE FOR DISPLAYING CAD-DRAWINGS

[76] Inventor: Willi Naumann, Otto-Flake-Weg 2, D-76571 Gaggenau, Germany

[21] Appl. No.: 201,891

[22] Filed: Feb. 25, 1994

[30] Foreign Application Priority Data

Mar. 2, 1993 [DE] Germany ............... 93 02 966 U

[51] Int. Cl.6 ............................................. B43L 13/00
[52] U.S. Cl. ...................................... 33/18.1; 33/1 M; 434/411
[58] Field of Search .................... 33/18.1, 1 M, 34; 434/411, 412, 432; 248/917, 918

[56] References Cited

U.S. PATENT DOCUMENTS

| 1,227,205 | 5/1917 | Sartakoff | 434/411 |
| 3,742,902 | 7/1973 | Heston Jr. | |
| 3,873,769 | 3/1975 | Cotter | 33/1 M |
| 4,506,336 | 3/1985 | Hird | 33/1 M |
| 4,593,469 | 6/1986 | Shoup II | 33/18.1 |
| 5,292,097 | 3/1994 | Russell | 248/918 |

FOREIGN PATENT DOCUMENTS

| 2532546 | 2/1976 | Germany . | |
| 3112552 | 11/1982 | Germany . | |
| 3427306 | 2/1985 | Germany . | |
| 3438427 | 5/1985 | Germany . | |
| 2-155798 | 6/1990 | Japan | 434/411 |

Primary Examiner—Thomas B. Will
Assistant Examiner—G. Bradley Bennett
Attorney, Agent, or Firm—Collard & Roe

[57] ABSTRACT

A device for displaying CAD drawings with a plotter, substantially consisting of a mounting for a plotter pen, such mounting being movably guided in accordance with a program in two coordinated directions relative to a drawing carrier. The drawing carrier is arranged in a frame and is embodied in the form of a board or foil with a surface, or layer to which the ink of the plotter pen adheres only temporarily and is removable again by means of an erasing device.

7 Claims, 2 Drawing Sheets

DEVICE FOR DISPLAYING CAD-DRAWINGS

BACKGROUND OF THE INVENTION

1. Field of the Invention

The present invention relates to a device for displaying computer-aided design (CAD) drawings with a plotter. More particularly, it relates to a device where CAD drawings can be repeatedly displayed and erased during the draft phase.

2. The Prior Art

When creating CAD drawings that are larger than DIN A-3, it is difficult to clearly display on the monitor the complex connections of the design of the drawing. Since only a fraction of the drawing is displayed on the monitor, the designer cannot view the entire drawing at once.

For this reason, drawings are printed out on paper many times during the draft phase. This consumes a lot of paper. Furthermore, it is very troublesome to repeatedly insert the paper into the plotter. Moreover, in most offices, there is insufficient space available for suspending the drawings. Finally, discarding the draft drawings is wasteful. Due to the relatively small screen even with large monitors, the drawing cannot be completely displayed with sufficient clarity before it is plotted out, and control or correction of the drawing by the engineering manager is, therefore, difficult.

SUMMARY OF THE INVENTION

It is therefore an object of the present invention to create a device where the complex connections on the drawings can be clearly recognized in the draft phase and prior to the final printing without always having to consume drawing paper.

These and other related objects are achieved according to the invention in that the drawing carrier, which is arranged in a frame, is embodied in the form of a board or foil with a surface or layer to which the ink from the plotter pen temporarily adheres and is removed by an erasing device.

With the device according to the invention, the important advantage obtained is that during the draft phase, the drawing always can be represented in its totality without having to suspend the drawings plotted on paper. Furthermore, a great quantity of drawing paper is saved, and discarding of the drawing paper is no longer required. Correction and control by the engineering manager is made possible in a simple way.

BRIEF DESCRIPTION OF THE DRAWINGS

Other objects and features of the present invention will become apparent from the following detailed description considered in connection with the accompanying drawings which discloses two embodiments of the present invention. It should be understood, however, that the drawings are designed for the purpose of illustration only and not as a definition of the limits of the invention.

In the drawings, wherein similar reference characters denote similar elements throughout the several views.

DETAILED DESCRIPTION OF PREFERRED EMBODIMENTS

Figure 1:
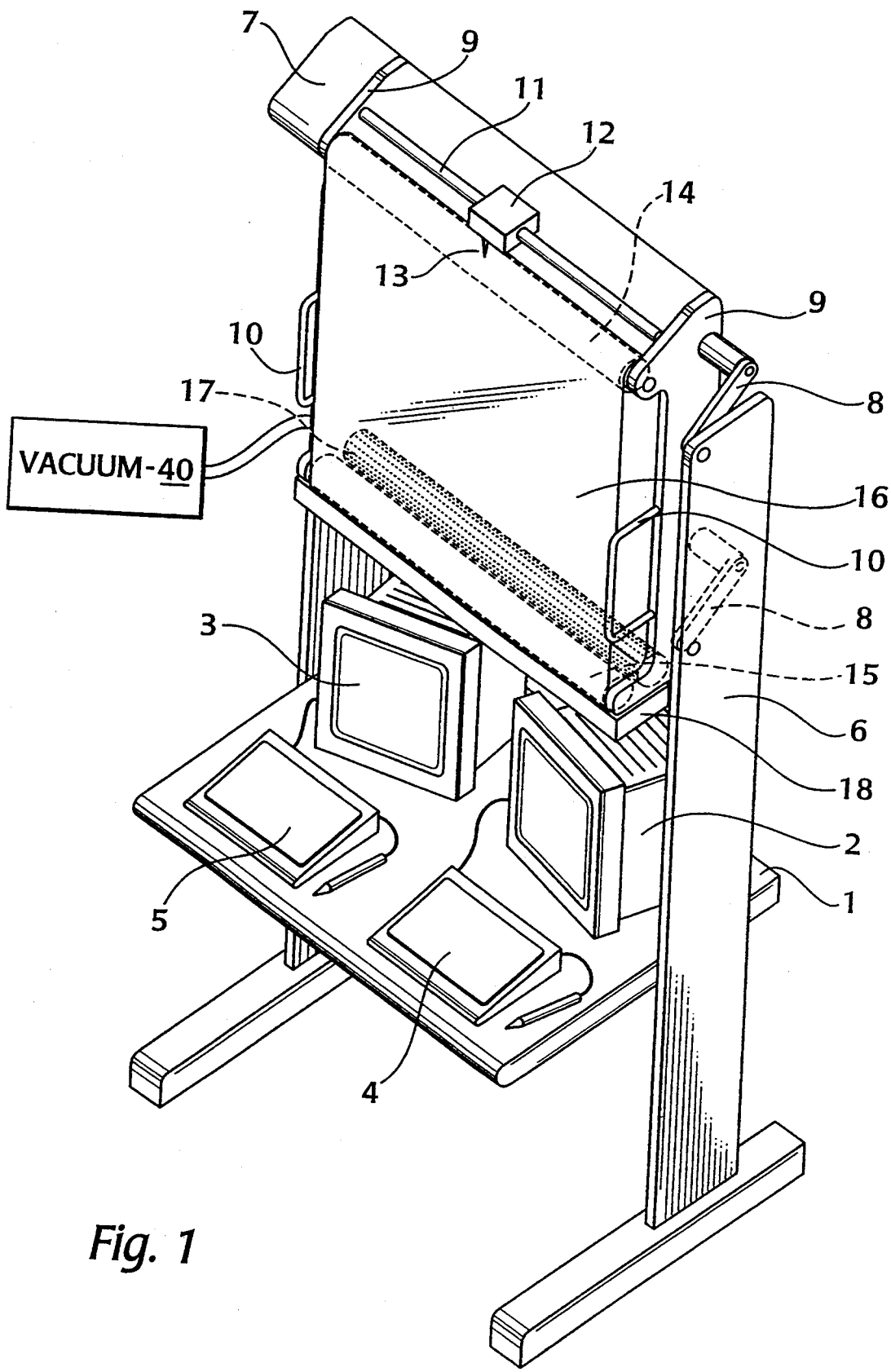
FIG. 1 is a perspective view of an embodiment of the device according to the invention with an endless foil loop.

Referring now in detail to the drawings and in particular FIG. 1, where is shown on a work table 1, with two monitors 2 and 3 set up with their input units 4 and 5. Above monitors 2, 3, a plotter 7 is pivotally mounted in a frame 6 via four levers 8. Two handles 10 are mounted on two lateral end brackets 9, for pulling plotter 7 into the work area of the operator. Between the two lateral end brackets 9, on the top side there is a rail guide 11, on which the plotter head 12 with the pen 13 is longitudinally movable between lateral brackets 9 and controlled by the program. Furthermore, a top roller 14 and a bottom roller 15 are arranged between lateral end brackets 9, with an endless revolving foil tape 16 being arranged around rollers 14 and 15. In this connection, the top roller 14 drives foil tape 16 according to the program control. Foil tape 16 moves in a direction perpendicular to the direction of movement of plotter head 12, as is conventional with plotters. The drawing is then applied to foil tape 16 in accordance with the program as well, in a manner which permits it to be wiped off.

A brush 17, for example a brush roller, is arranged on the underside between the two lateral end brackets 9, which brush roller is applied to the foil tape 16 by respective control, and erases the lines of print on said foil tape by a rotating motion of the latter.

Figure 2:
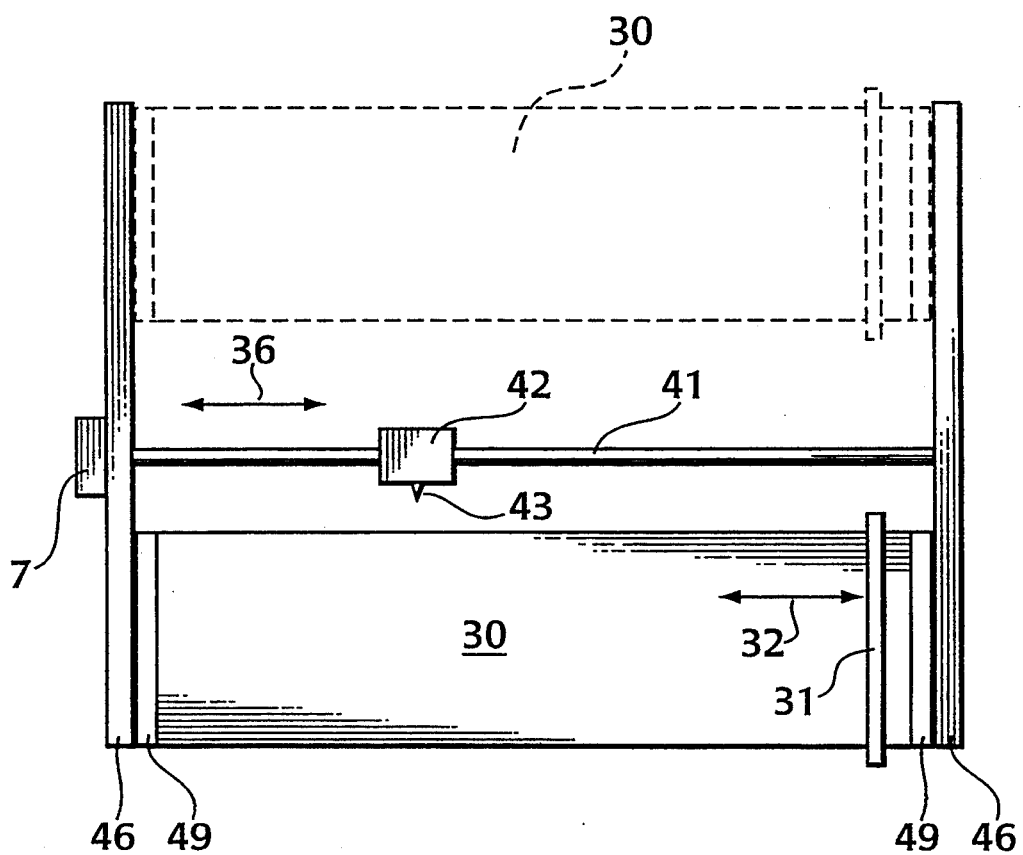
FIG. 2 is a schematic diagram of an alternate embodiment of the device according to the invention utilizing a board.

As can be seen in FIG. 2, the device may alternately include a planar board 30 instead of the revolving foil tape. Board 30 is moved upwardly (to the position shown in dotted lines), or downwardly (to the position shown in solid lines) with respect to frame 46 in accordance with the program. Plotter head 42 for the pen 43 is arranged in front of the board. Plotter head 42 is slidable between the sides of frame 46 along guide rail 41 in direction 36 according to the program. Accordingly, pen 43 moves in two directions with respect to board 30. For wiping off the board, a brush 31 can be moved across the board in direction 32.

Referring again to FIG. 1, a collecting device 18 is arranged beneath the bottom roller 15 for collecting the dust produced by brush 17. Such device can be designed as a vacuum cleaner as well.

The plotter of the device according to the invention can be designed also as an ink jet plotter, whereby the printing or drawing ink has a composition such that it can be wiped off dry from the foil.

Furthermore, it is possible also to generate with the plotter final technical drawings without major changes to the device. For example, paper or film is placed over foil tape 16 or board 30 with plotter 7 printing the drawing onto the paper or film.

While several embodiments of the present invention have been shown and described, it is to be understood that many changes and modifications may be made thereunto without departing from the spirit and scope of the invention as defined in the appended claims.

What is claimed is:

1. A device for displaying CAD drawings comprising:

a frame, two lateral end brackets arranged within said frame having an upper section and a lower section, and at least two levers pivotally connecting said two lateral end brackets to said frame;

two rollers rotatably mounted between said two lateral end brackets and an endless foil loop rotatably mounted around said two rollers defining a drawing surface;

a handle mounted on each of said lateral end brackets adapted for pivoting said drawing surface into a work area of a CAD operator;

a plotter pen for dispensing ink;

a guide rail mounted between said two lateral parts in the upper section and a head movably supported on said guide rail for holding said plotter pen, said plotter pen and said drawing surface being movable in accordance with a program in two coordinate directions relative to each other for temporarily applying ink to said drawing surface; and an erasing device comprising a brush disposed between said two lateral brackets, in the lower region, for erasing the ink from said foil loop.

2. The device according to claim 1, additionally including:

a brush drive operatively coupled to said brush; and;

a separate roller drive operatively coupled to one of said two rollers.

3. The device according to claim 2, additionally including:

a collecting device disposed in the lower section beneath said drawing surface for collecting the ink erased from said drawing surface.

4. The device according to claim 3, wherein said collecting device comprises a vacuum cleaner.

5. The device according to claim 4, wherein said plotter pen comprises an ink jet plotter having erasable ink that dries on said drawing surface and is removed by said erasing device.

6. A method for repeatedly displaying CAD drawings on a reusable drawing surface, comprising the steps of:

mounting a rotating reusable endless foil loop adjacent to a movable plotter;

plotting a draft drawing on the endless foil loop by moving the plotter and the endless foil loop in accordance with a program in two coordinate directions relative to each other;

erasing the draft drawing with a rotating brush;

repeating said steps of plotting and erasing the draft drawing until the draft drawing is finalized;

mounting a sheet of paper on the foil loop; and plotting the finalized drawing on the sheet of paper.

7. A device for displaying CAD drawings comprising:

a frame and two lateral end brackets slidably mounted within said frame;

a planar board mounted on said two lateral end brackets defining a drawing surface;

a plotter pen for dispensing ink;

a guide rail mounted on said frame and a head slidably supported on said guide rail for holding said plotter pen, said head and said drawing surface being movable in accordance with a program in two coordinate directions relative to each other for temporarily applying ink to said drawing surface with said plotter pen; and an erasing device movable across said board for removing the ink from the drawing surface.

* * * * *